United States Patent [19]

Brand

[11] Patent Number: 4,744,153
[45] Date of Patent: May 17, 1988

[54] METHOD AND APPARATUS FOR DETERMINING THE THICKNESS OF SHIM REQUIRED FOR PROPERLY LOADING AND POSITIONING THE BEARING ASSEMBLY OF A MARINE PROPULSION DEVICE DRIVE SHAFT

[75] Inventor: William E. Brand, Kenosha, Wis.

[73] Assignee: Outboard Marine Corporation, Waukegan, Ill.

[21] Appl. No.: 910,445

[22] Filed: Sep. 22, 1986

[51] Int. Cl.[4] .............................. B23P 19/04
[52] U.S. Cl. ...................... 33/517; 33/606; 29/705
[58] Field of Search ............... 33/517, 606; 29/705, 29/407, 460, 434

[56] References Cited

U.S. PATENT DOCUMENTS

| | | | |
|---|---|---|---|
| 2,118,756 | 5/1938 | Bergert | 33/517 X |
| 2,170,493 | 8/1939 | Clapper | 33/517 X |
| 2,402,142 | 6/1946 | Anderer et al. | |
| 2,576,377 | 11/1951 | Wochos, Jr. et al. | |
| 2,688,193 | 9/1954 | Holton | |
| 3,191,259 | 6/1965 | Dalton | 33/517 X |
| 3,529,942 | 9/1970 | Pitner | |
| 3,698,056 | 10/1972 | Pierce et al. | 33/517 X |
| 3,703,769 | 11/1972 | Pfeiffer | |
| 3,859,729 | 1/1975 | Pfeiffer | |
| 3,869,803 | 3/1975 | Vaughan | |
| 3,875,646 | 4/1975 | Pfeiffer | |
| 4,054,999 | 10/1977 | Harbottle | |
| 4,182,011 | 1/1980 | Bretzger et al. | |
| 4,212,098 | 7/1980 | Sand | |
| 4,336,641 | 6/1982 | Bhatia | |
| 4,367,594 | 1/1983 | Murray, Jr. | |
| 4,468,861 | 9/1984 | Overland | |

Primary Examiner—William D. Martin, Jr.
Attorney, Agent, or Firm—Michael, Best & Friedrich

[57] ABSTRACT

An apparatus for use with a device including a wall surface, and a removable, rotatable shaft having thereon a reference point and a bearing assembly, the bearing assembly including a surface supported by the wall surface with a shim between the bearing assembly surface and the wall surface, and with a fixed distance between the wall surface and the reference point when the bearing assembly is axially loaded in the device, the apparatus being for measuring the required thickness of the shim without inserting the shaft into the device, and the apparatus comprising a mechanism for axially loading the bearing assembly with the shaft out of the device, and a gauge rod for measuring the existing distance between the bearing assembly surface and the reference point.

26 Claims, 3 Drawing Sheets

METHOD AND APPARATUS FOR DETERMINING THE THICKNESS OF SHIM REQUIRED FOR PROPERLY LOADING AND POSITIONING THE BEARING ASSEMBLY OF A MARINE PROPULSION DEVICE DRIVE SHAFT

BACKGROUND OF THE INVENTION

The invention relates to methods and apparatus for determining the thickness of a shim or shims required for properly positioning or positioning and loading the bearing assembly of a rotating drive shaft. More particularly, the invention relates to such methods and apparatus used in connection with marine propulsion device drive shafts.

A typical marine propulsion device has a drive shaft rotatably supported by a bearing assembly. A shim located between the bearing assembly and a supporting wall provides proper axial loading or positioning of the bearing assembly.

In the past, persons making repairs in the field and attempting to determine the required thickness of the shim for positioning or loading of the bearing assembly usually inserted the drive shaft into the marine propulsion device with a shim in place and then determined whether the drive shaft was properly supported. If the shim did not have the proper thickness, it was necessary to remove the drive shaft and replace the shim with another shim. This process was repeated until the proper shim was found. Obviously, this required a great deal of time.

Attention is directed to the following U.S. patents:

| | | |
|---|---|---|
| Overland | 4,468,861 | Sep. 4, 1984 |
| Bhatia | 4,336,641 | Jun. 29, 1982 |
| Pfeiffer | 3,703,769 | Nov. 28, 1972 |
| Anderer, et al. | 2,402,142 | Jun. 18, 1946 |
| Harbottle | 4,054,999 | Oct. 25, 1977 |
| Pfeiffer | 3,875,646 | Apr. 8, 1975 |
| Wochos, Jr., et al. | 2,576,377 | Nov. 27, 1951 |
| Murray, Jr. | 4,367,594 | Jan. 11, 1983 |
| Sand | 4,212,098 | Jul. 15, 1980 |
| Bretzger, et al. | 4,182,011 | Jan. 8, 1980 |
| Vaughan | 3,869,803 | Mar. 11, 1975 |
| Pfeiffer | 3,859,729 | Jan. 14, 1975 |
| Pitner | 3,529,942 | Sep. 22, 1970 |
| Holton | 2,688,193 | Sep. 7, 1954 |

SUMMARY OF THE INVENTION

The invention provides an apparatus for use with a device including a wall surface, and a removable, rotatable shaft having therein a reference point and a bearing assembly, the bearing assembly including a surface supported by the wall surface with a shim between the bearing assembly surface and the wall surface, and with a fixed distance between the wall surface and the reference point when the bearing assembly is axially loaded in the device. The apparatus is for measuring the required thickness of the shim without inserting the shaft into the device, and the apparatus comprises means for axially loading the bearing assembly with the shaft out of the device, and means for measuring the existing distance between the bearing assembly surface and the reference point, whereby the thickness of the shim is determined by comparing the existing distance to the fixed distance.

In one embodiment, the shaft has thereon on a gear which is the reference point, and the measuring means measures the distance between the bearing assembly surface and the gear.

In one embodiment, the measuring means includes a gauge member extending generally parallel to the shaft and having a first end located a known distance from the bearing assembly surface, and an opposite second end located adjacent the reference point to form a gap between the second end and the reference point.

In one embodiment, the first end of the gauge member is aligned with the bearing assembly surface so that the known distance is equal to zero.

In one embodiment, the apparatus further comprises a wall, and means for supporting the shaft with the bearing assembly surface against the wall, and the gauge member extends from the wall toward the reference point.

In one embodiment, the loading means includes the supporting means.

In one embodiment, the bearing assembly is supported by a bearing housing including the wall surface and a housing surface spaced the known distance from the wall surface, and the first end of the gauge member is aligned with the housing surface.

In one embodiment, the loading means includes means for supporting the bearing assembly against movement in one direction axially of the shaft, and means for exerting on the bearing assembly in the one direction a force equal to the desired axial loading of the bearing assembly.

In one embodiment, the means for supporting the bearing assembly includes means for supporting the shaft against axial movement in the one direction.

In one embodiment, the means for supporting the bearing assembly includes means engageable with the bearing assembly for preventing movement of the bearing assembly in the one direction, and the means for exerting the force includes means for exerting the force on the shaft.

In one embodiment, the apparatus further comprises a frame including the supporting means, and the means for exerting the force includes a loading screw extending axially of the shaft and threadedly engaging the frame.

In one embodiment, the loading screw includes a screw portion threadedly engaging the frame and extending axially of the shaft, a loading portion adapted to engage the shaft or the bearing assembly to exert the force thereon, the loading portion being mounted on the screw portion for sliding movement relative thereto axially of the shaft, and a spring located between the screw portion and the loading portion for biasing the loading portion in the one direction relative to the screw portion.

In one embodiment, the loading screw includes means for indicating when the force exerted by the spring on the loading portion is equal to the desired axial loading of the bearing assembly.

In one embodiment the indicating means includes means for indicating the deflection of the spring.

In one embodiment, the device includes a second wall surface, the shaft has thereon a second bearing assembly including a second surface supported by the second wall surface with a second shim between the second bearing assembly surface and the second wall surface, the second bearing assembly surface is the reference point, and the measuring means measures the distance between the first-mentioned bearing assembly surface and the second bearing assembly surface.

The invention also provides an apparatus for use with a device including a first wall surface, a second wall surface, and a removable, rotatable shaft having thereon a reference point, the shaft also having thereon a first bearing assembly including a first surface supported by the first wall surface with a first shim between the first bearing assembly surface and the first wall surface, and with a first fixed distance between the first wall surface and the reference point when the first bearing assembly is axially loaded in the device, and the shaft further having thereon a second bearing assembly including a second surface supported by the second wall surface with a second shim between the second bearing assembly surface and the second wall surface, and with a second fixed distance between the first wall surface and the second bearing assembly surface when the second bearing assembly is axially loaded in the device, the apparatus measuring the required thicknesses of the first and second shims without inserting the shaft into the device, and the apparatus comprising first means for axially loading the first bearing assembly with the shaft out of the device, second means for axially loading the second bearing assembly with the shaft out of the device, third means for measuring the first existing distance between the first bearing assembly surface and the reference point, and fourth means for measuring the second existing distance between the first bearing assembly surface and the second bearing assembly surface, whereby the thickness of the first shim is determined by comparing the first existing distance to the first fixed distance, and whereby the thickness of the second shim is determined by comparing the second existing distance to the second fixed distance, and, if the second wall surface faces in the same direction as the first wall surface, adding the thickness of the first shim, or, if the second wall surface faces in the opposite direction from the first wall surface, subtracting the thickness of the first shim.

In one embodiment, the third means includes a first gauge member extending generally parallel to the shaft and having a first end located a known distance from the first bearing assembly surface, and an opposite second end located adjacent the reference point to form a gap between the second end and the reference point, and wherein the fourth means includes a second gauge member extending generally parallel to the shaft and having a first end located a known distance from the first bearing assembly surface, and an opposite second end located adjacent the second bearing assembly surface to form a second gap between the second end of the second gauge member and the second bearing assembly surface.

In one embodiment, the first and second means include means for simultaneously and equally loading the first and second bearing assemblies with the shaft out of the device.

The invention also provides a method for use with a device including a wall surface, and a removable, rotatable shaft having thereon a reference point and a bearing assembly, the bearing assembly having a surface supported by the wall surface with a shim between the bearing assembly surface and the wall surface, and with a fixed distance between the wall surface and the reference point when the bearing assembly is axially loaded in the device. The method is for measuring the required thickness of the shim without inserting the shaft into the device, and the method comprises the steps of axially loading the bearing assembly with the shaft out of the device, and measuring the existing distance between the bearing assembly surface and the reference point, whereby the thickness of the shim is determined by comparing the existing distance to the fixed distance.

In one embodiment, the shaft has thereon a gear which is the reference point, and the measuring step includes measuring the distance between the bearing assembly surface and the gear.

In one embodiment, the measuring step includes the steps of providing a member having opposite first and second ends, extending the member generally parallel to the shaft with the first end located a known distance from the bearing assembly surface and with the second end located adjacent the reference point to form a gap between the second end and the reference point, and measuring the width of the gap.

the rod member with the first end aligned with the bearing assembly surface so that the known distance is equal to zero.

In one embodiment, the member has a length, and the calculating step includes calculating the difference between the fixed distance and the sum of the width of the gap and the length of the member.

The invention also provides a method for use with a device including a first wall surface, second wall surface, and a removable, rotatable shaft having thereon a reference point, the shaft also having thereon a first bearing assembly including a first surface supported by the first wall surface with a first shim between the first bearing assembly surface and the first wall surface, and with a first fixed distance between the first wall surface and the reference point when the first bearing assembly is axially loaded in the device, and the shaft further having thereon a second bearing assembly including a second surface supported by the second wall surface with a second shim between the second bearing assembly surface and the second wall surface, and with a second fixed distance between the first wall surface and the second bearing assembly surface when the second bearing assembly is axially loaded in the device, the method measuring the required thicknesses of the first and second shims without inserting the shaft into the device, and the method comprising the steps of axially loading the first bearing assembly with the shaft out of the device, axially loading the second bearing assembly with the shaft out of the device, measuring the first existing distance between the first bearing assembly surface and the reference point, and measuring the second existing distance between the first bearing assembly surface and the second bearing assembly surface, whereby the thickness of the first shim is determined by comparing the first existing distance to the first fixed distance, and whereby the thickness of the second shim is determined by comparing the second existing distance to the second fixed distance, and, if the second wall surface faces in the same direction as the first wall surface, adding the thickness of the first shim, or, if the second wall surface faces in the opposite direction from the first wall surface, subtracting the thickness of the first shim.

In one embodiment, the first measuring step includes the steps of providing a first member having opposite first and second ends, extending the first member generally parallel to the shaft with the first end located a known distance from the first bearing assembly surface and with the second end located adjacent the reference point to form a gap between the second end and the reference point, and measuring the width of the gap, and wherein the second measuring step includes the steps of providing a second member having opposite first and second ends, extending the second member generally parallel to the shaft with the first end of the second member spaced a known distance from the first bearing assembly surface and with the second end of the second member located adjacent the second bearing assembly surface to form a second gap between the second end of the second member and the second bearing assembly surface, and measuring the width of the second gap.

In one embodiment, the first and second loading steps include the step of simultaneously and equally loading the first and second bearing assemblies with the shaft out of the device.

A principal feature of the invention is the provision of a method and apparatus for determining the thickness of a shim for a marine propulsion device drive shaft without inserting the drive shaft into the marine propulsion device. As a result, it is no longer necessary for persons making repairs in the field to insert the drive shaft into the marine propulsion device with a shim in place and then determine whether the drive shaft is properly supported. While the method and apparatus of the invention are intended primarily for use in the field, it should be understood that they can also be used in manufacturing.

Another principal feature of the invention is the provision of an apparatus for determining the thicknesses of two shims which support respective bearing assemblies, the apparatus comprising means for simultaneously and equally loading the bearing assemblies without inserting the drive shaft into the marine propulsion device. Thus, the user can place the drive shaft in the apparatus and then measure the thicknesses of both shims without changing the setup of the apparatus.

Another principal feature of the invention is the provision of a method and apparatus for determining the required thicknesses of two shims on a single drive shaft.

Other features and advantages of the invention will become apparent to those skilled in the art upon review of the following detailed description, claims and drawings.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A marine propulsion device 10 in connection with which the method and apparatus of the invention are used is illustrated in FIGS. 1, 2 and 12-14. While the illustrated marine propulsion device 10 is a stern drive unit, it should be understood that the method and apparatus of the invention are applicable to other types of marine propulsion devices.

Figures 1, 2, 8, 12, 13, 14:
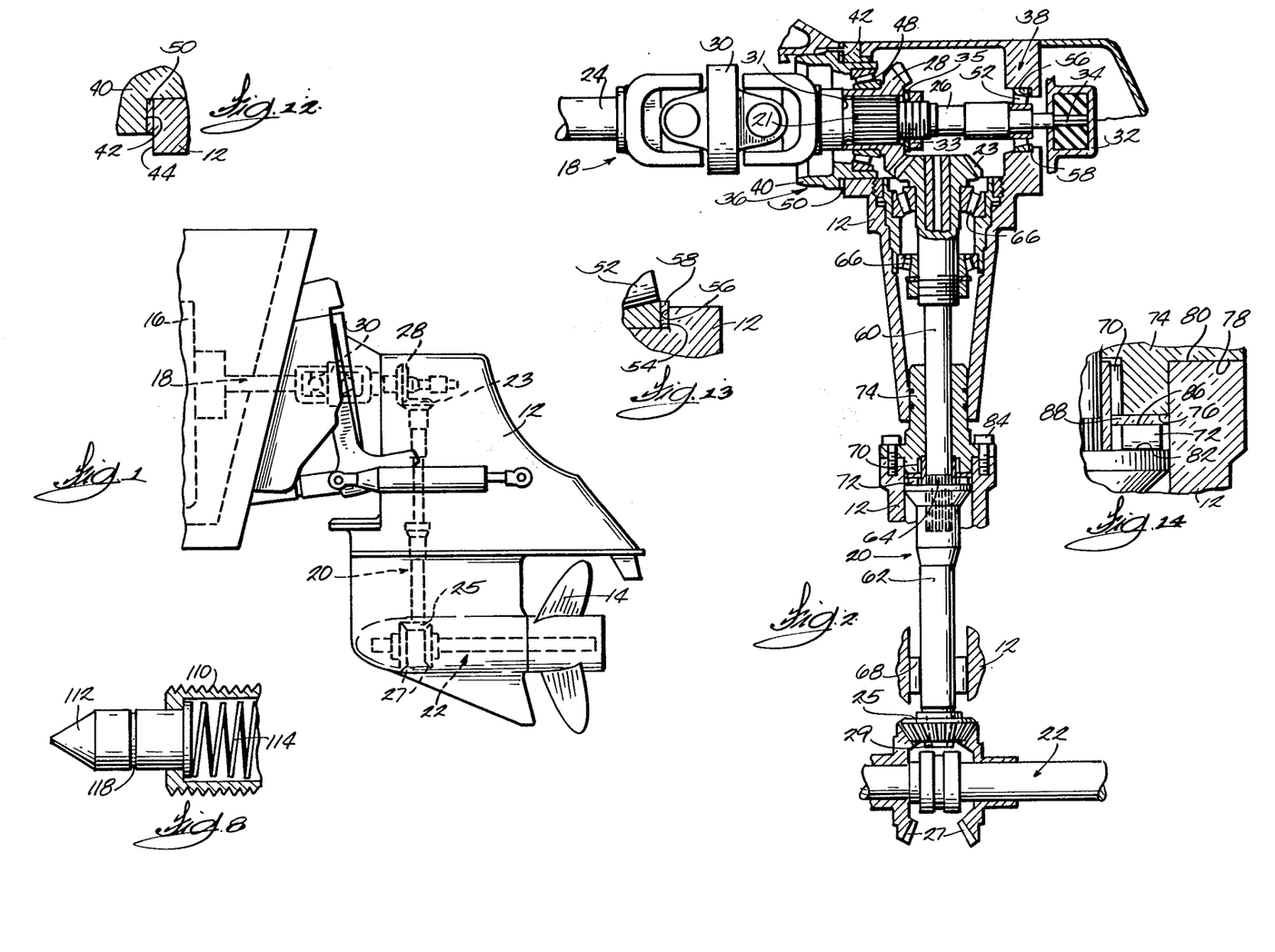
FIG. 1 is a side elevational view of a marine propulsion device in connection with which the method and apparatus of the invention are used.
FIG. 2 is an enlarged view, partially in cross section, of the drive train of the marine propulsion device.
FIG. 8 is a cross-sectional view taken along line 8—8 in FIG. 3.
FIG. 12 is an enlarged view of a portion of FIG. 2 showing the location of shim 50.
FIG. 13 is an enlarged view of a portion of FIG. 2 showing the location of shim 58.
FIG. 14 is an enlarged view of a portion of FIG. 2 showing the location of shim 88.

The marine propulsion device 10 includes a propulsion unit 12 having thereon a rotatably mounted propeller 14, and an engine 16 connected to the propeller 14 by a drive train. As shown in FIG. 1, the drive train includes a horizontal drive shaft 18 driven by the engine 16, a vertical drive shaft 20 driven by the horizontal drive shaft 18, and a propeller shaft 22 driven by the vertical drive shaft 20 and having mounted thereon the propeller 14.

As shown in FIG. 2, the horizontal shaft 18 has thereon a drive gear 28 which is fixed against rotation relative to the shaft 18 by splines 21, and which is fixed against movement axially of the shaft 18 by a shoulder 31 on the shaft 18 and by a nut 33 threaded onto the shaft 18. A washer 35 is located between the nut 33 and the gear 28. The vertical shaft 20 has on its upper end a gear 23 driven by the drive gear 28, and on its lower end a drive gear 25. A pinion nut 29 secures the gear 25 on the lower end of the vertical shaft 20. The propeller shaft 22 has thereon a pair of axially spaced driven gears 27 which are driven by the drive gear 25 and which are selectively clutched to the propeller shaft 22 by a conventional reversible transmission (not shown).

As also shown in FIG. 2, the horizontal drive shaft 18 comprises a forward segment 24 driven by the engine 16, and a rearward segment 26 connected to the forward segment 24 by a universal joint 30 and having mounted thereon the drive gear 28. The rearward (or right) end of the rearward segment 26 is drivingly connected to a water pump 32 by a pump drive shaft 34 which extends from the rearward end of the rearward segment 26 and which is connected to the rearward segment 26 by suitable means such as splines. This water pump arrangement is disclosed in Bland U.S. Pat. No. 4,565,534, issued Jan. 21, 1986, which is incorporated herein by reference.

Figure 3:
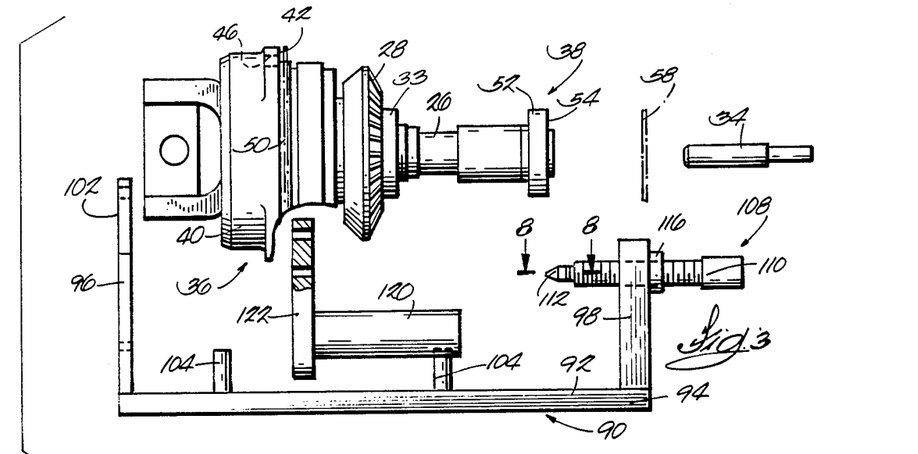
FIG. 3 is an exploded view of an apparatus embodying the invention and of the rearward segment of the horizontal drive shaft of the marine propulsion device.

The rearward segment 26 is rotatably supported within the propulsion unit 12 by a forward bearing assembly 36 and by a rearward bearing assembly 38. The forward bearing assembly 36 includes an annular bearing carrier 40 having an annular, rearwardly facing surface 42 (FIGS. 2 and 12) which is supported by an annular, forwardly facing wall surface 44 (FIG. 12) within the propulsion unit 12. The bearing carrier 40 includes a flange having therein (see FIG. 3) a plurality of bores 46, and the bearing carrier is secured to the wall surface 44 by bolts (not shown) extending through the bores 46. The bearing carrier 40 supports (see FIG. 2) a tapered roller bearing 48 which in turn rotatably supports the drive gear 28 mounted on the rearward segment 26. As shown in FIGS. 2 and 12, a shim 50 located between the bearing carrier surface 42 and the wall surface 44 provides proper location of the rearward segment 26 and proper axial loading of the bearing 48.

The rearward bearing assembly 38 includes (see FIGS. 2 and 13) a tapered roller bearing 52 which rotatably supports the rearward end of the rearward segment 26. The bearing 52 has a rearwardly facing surface 54 (FIG. 13) which is supported by an annular, forwardly facing wall surface 56 (FIGS. 2 and 13) within the propulsion unit 12. A second shim 58 is located between the bearing surface 54 and the wall surface 56.

When the shims 50 and 58 have the proper thicknesses and when the bearing assemblies 36 and 38 are axially loaded in the marine propulsion device 10, the drive gear 28 is a fixed distance from the rearward wall surface 56. Also, the forward wall surface 44 is a fixed distance from the rearward wall surface 56.

As shown in FIG. 2, the vertical drive shaft 20 includes an upper segment 60 with an upper end having mounted thereon the driven gear 23, and a lower end. The vertical drive shaft 20 also includes a lower segment 62 having an upper end connected to the lower end of the upper segment 60 by splines 64, and a lower end having mounted thereon the drive gear 25. This arrangement is disclosed in Bland, et al. U.S. patent application Ser. No. 723,310, filed April 15, 1985, which is incorporated herein by reference.

The upper segment 60 is supported by a pair of bearing assemblies 66 which rotatably support the driven gear 23. The lower segment 62 is supported at its lower end by a bearing assembly 68, and at its upper end by a pair of bearing assemblies 70 and 72.

As shown in FIGS. 2 and 14, the first bearing assembly 70 is supported by a bearing housing 74 which is in turn supported within the propulsion unit 12. More particularly, the bearing housing 74 includes (see FIG. 14) a downwardly facing housing surface 78 which is supported by an upwardly facing wall surface 80 within the propulsion unit 12. The bearing housing 74 is secured to the propulsion unit 12 by suitable means such as bolts 84 (FIG. 2). The bearing housing 74 also includes (see FIG. 14) an annular, downwardly facing wall surface 76 which is spaced a known distance from the housing surface 78.

The second bearing assembly 72 is a thrust bearing assembly and is located (see FIG. 14) between the bearing housing wall surface 76 and an annular, upwardly facing shoulder 82 on the lower segment 62. The bearing assembly 72 includes an annular, upwardly facing surface 86 supported by the bearing housing surface 76 with a third shim 88 between the bearing housing surface 76 and the bearing assembly surface 86. When the shim 88 has the proper thickness, and when the bearing assembly 72 is axially loaded in the marine propulsion device 10, there is a fixed distance between the bearing housing wall surface 76 and the drive gear 25.

In the past, in order for persons making repairs in the field to determine the required thicknesses of the shims 50, 58 and 88 for proper loading and positioning of the bearing assemblies 36, 38 and 72, it was necessary to insert the drive shafts 18 and 20 into the propulsion unit 12 with shims 50, 58 and 88 in place and then determine whether the drive shafts were properly supported. If any of the shims did not have the proper thickness, it was necessary to remove the drive shaft or drive shafts and replace the improper shim or shims with another shim. This process was repeated until the proper shims were found.

Illustrated in FIGS. 3-11 is an apparatus 90 which embodies the invention and which is used for determining the proper thicknesses of the shims 50, 58 and 88 without inserting the shafts 18 and 20 or shaft segments 26 and 62 into the marine propulsion device 10. It is assumed that certain distances within the marine propulsion device 10, i.e. the distance between the wall surface 56 and the gear 28, the distance between the wall surface 56 and the wall surface 44, and the distance between the bearing housing surface 76 and the drive gear 25, are known.

The apparatus 90 comprises a frame 92 including a generally planar base 94 and spaced apart, generally parallel end walls 96 and 98 extending from the base 94. The end wall 96 has therein (see FIG. 10) a generally semi-circular recess 100 such that the end wall 96 has a partially annular outer surface 102 corresponding or conforming to a portion of the wall surface 44 in the marine propulsion device 10. The frame 92 also includes a pair of spaced apart support members 104 located between the end walls 96 and 98 and extending generally parallel thereto.

The apparatus 90 also comprises means for axially loading the forward and rearward bearing assemblies 36 and 38 with the rearward segment 26 of the horizontal drive shaft 18 out of the marine propulsion device 10. Preferably, the loading means loads the bearing assemblies 36 and 38 simultaneously and with equal loads. While various suitable loading means can be employed, in the preferred embodiment, the loading means includes means for supporting the rearward segment 26 on the frame 92. While various suitable supporting means can be used, in the illustrated construction, the supporting means includes means for securing the bearing carrier 40 to the end wall 96 with the forward bearing assembly surface 42 against the outer surface 102 of the frame end wall 96. While various suitable securing means can be employed, in the preferred embodiment, the securing means includes a plurality of bolts 106 which extend through the bores 46 in the bearing carrier 40 and which threadedly engage the end wall 96.

Figure 4:
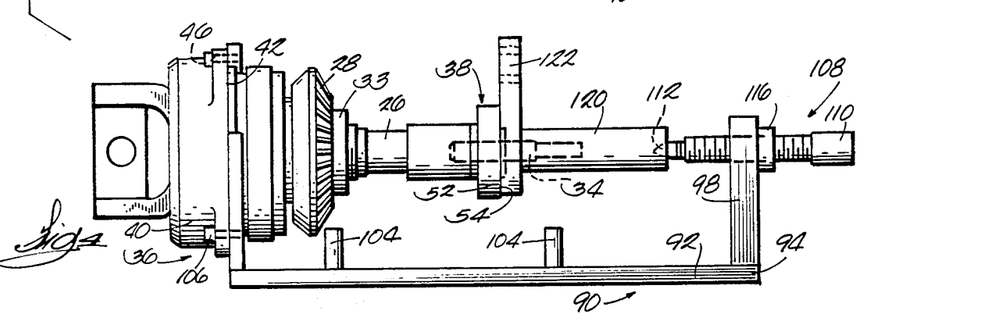
FIG. 4 is a side elevational view of the apparatus supporting the rearward segment of the horizontal drive shaft.

In the preferred embodiment, the supporting or securing means supports the forward bearing assembly 36 and therefore both the shaft 26 and the rearward bearing assembly 38 against movement in one direction axially of the shaft 26 (to the left in FIG. 4). More particularly, the end wall 96 engages the forward bearing assembly 36 to prevent movement thereof to the left.

The loading means also includes means for exerting on the bearing assemblies 36 and 38, in the one direction (to the left), a force equal to the desired axial loading of the bearing assemblies 36 and 38. While various suitable force exerting means can be used, in the illustrated construction, such means includes means for exerting the force on the rearward segment 26. Preferably, this means includes a loading screw 108 extending axially of the shaft segment 26 and threadedly engaging the end wall 98 of the frame 92.

The loading screw 108 includes a screw portion 110 threadedly engaging the end wall 98 and extending axially of the shaft segment 26, and a loading portion 112 adapted to engage the shaft segment 26 or the bearing assembly 38 to exert thereon the force. As shown in FIG. 8, the loading portion 112 is mounted within the screw portion 110 for sliding movement relative thereto axially of the shaft 26, and the loading screw 108 also includes a spring 114 located between the screw portion 110 and the loading portion 112 for biasing the loading portion 112 in the direction of the force (to the left in FIG. 8). A jam nut 116 secures the screw portion 110 relative to the end wall 98.

In the preferred embodiment, the loading screw 108 further includes means for indicating when the force exerted by the spring 114 on the loading portion 112 (and thus the force exerted by the loading portion 112 on the shaft 26 or bearing assembly 38) is equal to the desired axial loading of the bearing assemblies 36 and 38. While various suitable indicating means can be employed, in the preferred embodiment, such means includes means for indicating the deflection of the spring 114. Preferably, this means includes an annular groove 118 extending around the outer surface of the loading portion 112 and being located such that, when the groove 118 is aligned with the end of the screw portion 110, the deflection of the spring 114 results in the desired axial loading of the bearing assemblies 36 and 38.

In the preferred embodiment, the loading means also includes an adaptor member 120 which fits over the pump drive shaft 34 and which includes a wall 122 that engages the bearing assembly surface 54. For reasons that will become apparent, the wall 122 extends radially outwardly of the shaft 26 and generally perpendicularly to the shaft axis. As shown in FIG. 4, the loading portion 112 of the loading screw 108 directly engages the adaptor 120 rather than the shaft segment 26 or bearing assembly 38, and the adaptor 120 in turn engages the bearing assembly surface 54. The loading force exerted on the adaptor 120 and thereby on the bearing assembly 38 by the loading screw 108 is adjusted by turning the screw portion 110 relative to the end wall 96.

The apparatus 90 also comprises means for measuring the distance between the bearing assembly surface 54 and a reference point on the rearward segment 26. In the preferred embodiment, the reference point is the drive gear 28, and the measuring means measures the distance between the bearing assembly surface 54 and the drive gear 28. While various suitable measuring means can be employed, in the illustrated construction, the measuring means includes a gauge member or rod 124 extending generally parallel to the rearward segment 26. The gauge member 124 has a first end removably connected to the adaptor wall 122 by a bolt 126, and an opposite second end located adjacent the gear 28 to form a gap 128 between the second end of the gauge member 124 and the gear 28. Thus, the gauge member 124 extends from the adaptor wall 122 toward the gear 28. Because it is connected to the adaptor wall 122, the first end of the gauge member 124 is aligned axially of the shaft 26 with the bearing assembly surface 54.

The apparatus 90 further comprises means for measuring the distance between the rearward bearing assembly surface 54 and the forward bearing assembly surface 42. While various suitable means can be employed, in the preferred embodiment, such means includes a second gauge member 130 extending generally parallel to the rearward segment 26. The second gauge member 130 has a first end removably connected to the adaptor wall 122 (and therefore aligned axially of the shaft 26 with the rearward bearing assembly surface 54) by a bolt 132, and an opposite second end located adjacent the forward bearing assembly surface 42 to form a second gap 134 between the second end of the gauge member 130 and the forward bearing assembly surface 42.

Figure 5:
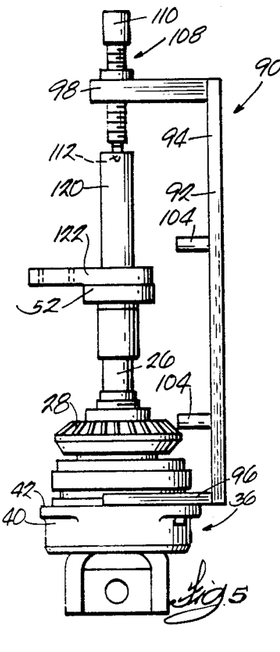
FIGS. 5-7 are side elevational views of the apparatus as shown in FIG. 4 but turned to extend vertically.
Figure 6:
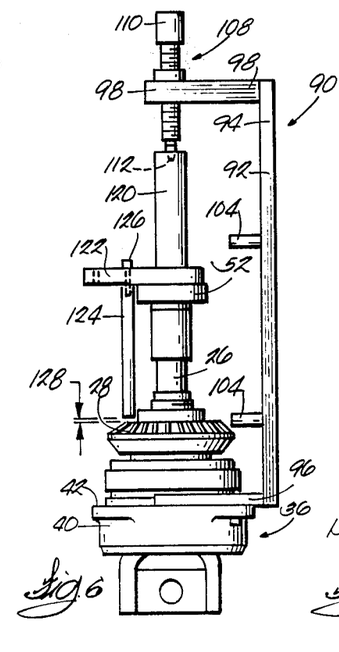
Figure 7:
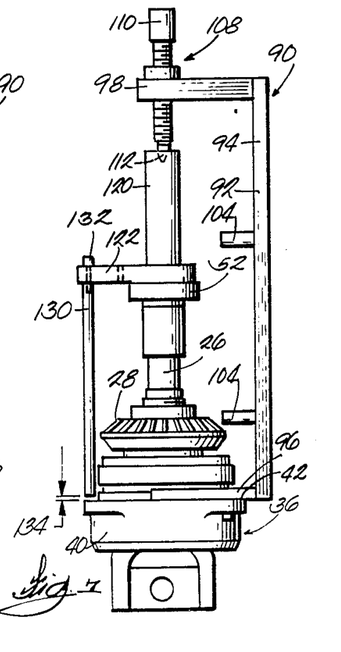

The apparatus 90 is used as follows to measure the required thicknesses of the shims 50 and 58. Without installing any shims, the bearing carrier 40 is mounted on the end wall 96 with the bolts 106. Also, the adaptor 120 is placed over the pump drive shaft 34 and the loading screw 108 is turned until the adaptor 120 is engaged by the loading portion 112. In order to provide proper loading of the bearing assemblies 36 and 38, the frame 92 is turned vertically, as shown in FIGS. 5–7, prior to tightening the loading screw 108 to load the bearing assemblies 36 and 38. The frame 92 can be secured in the vertical position by a vise or by any other suitable means. Next, the loading screw 108 is tightened while simultaneously rotating the rearward shaft segment 26. When the groove 118 is aligned with the end of the screw portion 110, the bearing assemblies 36 and 38 are properly loaded. The jam nut 116 is tightened to secure the screw portion 110 of the loading screw 108 in the proper position.

Next, the gauge member or rod 124 is secured to the adaptor 120 with the bolt 126, and the width of the gap 128 between the end of the gauge member 124 and the gear 28 is measured. The gap 128 can be measured by any suitable means, such as a feeler gauge. Because the length of the gauge member 124 is known, measuring the gap 128 determines the distance between the bearing assembly surface 54 and the gear 28, which distance is equal to the sum of the length of the gauge member 124 and the width of the gap 128.

Finally, the measured distance (the distance between the bearing assembly surface 54 and the gear 28) is compared to the fixed distance between the wall surface 56 and the gear 28. In other words, the difference between the measured distance and the fixed distance is calculated. When the supporting wall surface faces the gear, as in the illustrated construction, this difference is equal to the fixed distance minus the measured distance. In alternative applications wherein the supporting wall surface faces away from the gear, this difference is equal to the measured distance minus the fixed distance.

Since the measured distance is equal to the sum of the length of the gauge member 124 and the width of the gap 128, the calculated difference between the measured distance and the fixed distance is equal to (the fixed distance minus the length of the gauge member 124) minus the width of the gap 128, where the width of the gap 128 is the only variable.

Assuming, for example, the difference between the fixed distance and the length of the gauge member 124 is equal to 0.020 inches, the required thickness of the shim 58 is equal to 0.020 inches minus the width of the gap 128. Thus, if the measured gap width is 0.008 inches, the required thickness of the shim 58 is 0.012 inches.

The required thickness of the shim 50 is determined as follows. First, the distance between the rearward bearing assembly surface 54 and the forward bearing assembly surface 42 is measured. This is done by connecting the second gauge member 130 to the adaptor 120 with the bolt 132, and measuring the width of the gap 134 between the second end of the second gauge member 130 and the forward bearing assembly surface 42. The distance between the two bearing assembly surfaces 54 and 42 is equal to the sum of the length of the second gauge member 130 and the width of the second gap 134.

Next, the measured distance (the distance between the two bearing assembly surfaces 42 and 54) is compared to the fixed distance between the two wall surfaces 44 and 56. In other words, the difference between these distances is calculated. In the preferred application, this difference is equal to the measured distance minus the fixed distance. In alternative applications, depending on the arrangement of the wall surfaces, this difference may be equal to the fixed distance minus the measured distance.

Finally, because the wall surface 44 faces in the same direction as the wall surface 56, the thickness of the shim 58 is added to the calculated difference between the measure distance and the fixed distance. (It should be noted that in alternative embodiments wherein the second wall surface faces opposite the first wall surface, the thickness of the first shim would be subtracted from the calculated difference between the measured distance and the fixed distance.) Since the measured distance is equal to the sum of the length of the second gauge member 130 plus the width of the second gap 134, the difference between the measured distance and the fixed distance is equal to (the length of the second gauge member 130 minus the fixed distance) minus the width of the second gap 134, with the width of the second gap 134 being the only variable.

Assuming, for example, that the length of the second gauge member 130 minus the fixed distance is equal to −0.020 inches, and that the measured width of the second gap 134 is equal to 0.022 inches, then the required thickness of the shim 50 is equal to 0.012 inches (the thickness of the shim 50) plus 0.022 inches minus 0.020 inches, or 0.014 inches.

The apparatus 90 also comprises means for axially loading the bearing assembly 72 with the lower segment 62 out of the marine propulsion device 10. While various suitable loading means can be employed, in the preferred embodiment, the loading means includes means for supporting the lower segment 62 on the frame 92. While various suitable supporting means can be used, in the illustrated construction, the supporting means includes means for securing the bearing housing 74 to the end wall 96.

Figure 9:
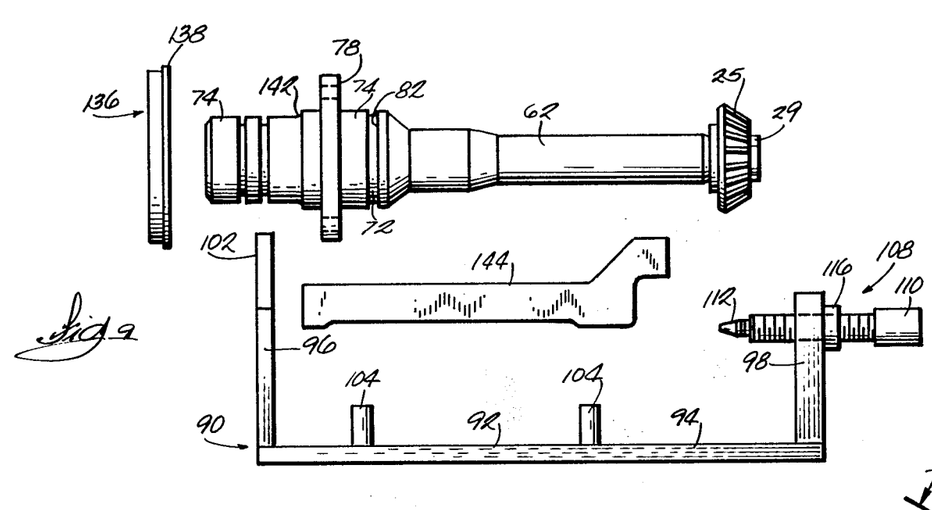
FIG. 9 is an exploded view of the apparatus and of the lower segment of the vertical drive shaft of the marine propulsion device.
Figure 10:
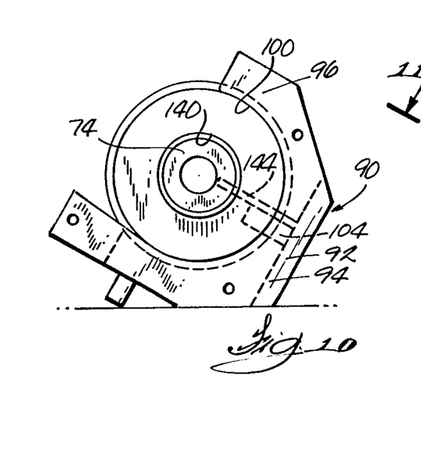
FIG. 10 is an end view of the apparatus supporting the lower segment of the vertical drive shaft.
Figure 11:
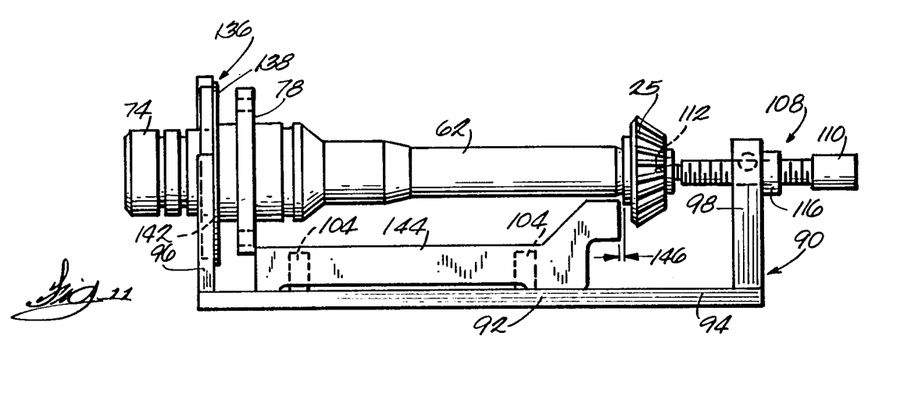
FIG. 11 is a view taken along line 11—11 in FIG. 10.

While various suitable securing means can be employed, in the preferred embodiment, the securing means includes an adaptor collar 136 which fits within the end wall recess 100 and which fits over the upper end of the bearing housing 74. As shown in FIGS. 9–11, the adaptor collar 136 includes an annular, outwardly extending flange 138 which engages the inner surface of the end wall 96 to prevent movement of the adaptor collar 136 to the left (as shown in FIG. 11) relative to the end wall 96. The adaptor collar 136 has therethrough a circular aperture 140 through which the upper end of the bearing housing 74 extends, and a shoulder 142 on the bearing housing 74 engages the inner surface of the adaptor collar 136 to prevent movement of the bearing housing 74 and thus of the lower segment 62 to the left relative to the adaptor collar 136 and to the end wall 96.

The means for loading the bearing assembly 72 also includes means for exerting on the bearing assembly 72 a force which is directed to the left and which is equal to the desired axial loading of the bearing assembly 72. While various suitable force exerting means can be used, in the illustrated construction, such means includes means for exerting the force on the lower segment 62. Preferably, this means includes the loading screw 108. As shown in FIG. 11, the loading portion 112 of the loading screw 108 engages the lower end of the lower segment 62 to exert thereon the force.

The apparatus 90 also comprises means for measuring the distance between the bearing assembly surface 86 and a reference point on the lower segment 62. In the preferred embodiment 25, the reference point is the drive gear 25, and the measuring means measures the distance between the bearing assembly surface 86 and the drive gear 25. While various suitable measuring means can be employed, in the preferred embodiment, the measuring means includes a gauge member or bar 144 extending generally parallel to the lower segment 62. The gauge member 144 has a first or left end aligned axially of the shaft 62 with the bearing housing surface 78 (and thus spaced a known distance from the bearing housing wall surface 76), and an opposite second end located adjacent the drive gear 25 to form a gap 146 between the second end and the drive gear 25. Preferably, the first end of the gauge member 146 abuts the bearing housing surface 78.

The apparatus 90 is used as follows to measure the required thickness of the shim 88. First, the pinion nut 29 on the lower end of the lower segment 62 is tightened to the proper torque. Next, without installing a shim, the lower segment 62 is mounted on the frame 92 with the bearing housing mounted on the end wall 96 by the adaptor collar 136 and with the loading screw 108 engaging the lower end of the lower segment 62. While simultaneously rotating the lower segment 62, the screw portion 110 is turned until the reference groove 118 is aligned with the end of the screw portion 110. The jam nut 116 is tightened to secure the screw portion 110 in the proper position.

Next, the frame 92 is tipped as shown in FIG. 10, and the gauge member or bar 144 is placed against the support members 104 with its first end abutting the housing surface 78 and with its second end extending toward the drive gear 25. Next, the width of the gap 146 between the gauge member 144 and the drive gear 25 is measured. Again, the gap 146 can be measured by any suitable means, such as a feeler gauge.

Because the length of the gauge member 144 is known, measuring the width of the gap 146 determines the distance between the housing surface 78 and the gear 25, which distance is equal to the sum of the length of the gauge member 144 and the width of the gap 146. Because the distance between the bearing housing surface 78 and the bearing surface 76 is known, this also determines the distance between the bearing surface 76 and the gear 25, which distance is equal to the sum of the length of the gauge member 144 and the width of the gap 146 minus the distance between the bearing housing surface 78 and the bearing surface 76.

Finally, the measured distance (the distance between the bearing surface 76 and the gear 25) is compared to the fixed distance between the bearing surface 76 and the gear 25. In other words, the difference between these distances is calculated. When the supporting wall surface faces the gear, as in the illustrated construction, this difference is equal to the fixed distance minus the measured distance. In alternative applications wherein the supporting wall surface faces away from the gear, this difference is equal to the measured distance minus the fixed distance Since the measured distance is equal to the sum of the length of the gauge member 144 and the width of the gap 146 minus the known distance between the housing surface 78 and the bearing surface 76, the calculated difference between the measured distance and the fixed distance is equal to (the fixed distance plus the known distance minus the length of the gauge member 144) minus the width of the gap 146, where the width of the gap 146 is the only variable.

Assuming, for example, that (the fixed distance plus the known distance minus the length of the gauge member 144) is equal to 0.020 inches, the required thickness of the shim 88 is equal to 0.020 inches minus the width of the gap 146. Thus, if the measured gap width is 0.014 inches, the required thickness of the shim 88 is 0.006 inches.

Various features and advantages of the invention are set forth in the following claims:

I claim:

1. An apparatus for use with a device including a wall surface, and a removable, rotatable shaft having thereon a reference point and a bearing assembly, the bearing assembly including a surface supported by the wall surface with a shim between the bearing assembly surface and the wall surface, and with a fixed distance between the wall surface and the reference point when the bearing assembly is axially loaded in the device, said apparatus measuring the required thickness of the shim without inserting the shaft into the device, and said apparatus comprising a frame, means on said frame for axially loading the bearing assembly with the shaft out of the device, and means on said frame for measuring the existing distance between the bearing assembly surface and the reference point, whereby the thickness of the shim is determined by comparing said existing distance to the fixed distance.

2. An apparatus as set forth in claim 1 wherein the shaft has thereon on a gear which is the reference point, and wherein said measuring means measures the distance between the bearing assembly surface and the gear.

3. An apparatus as set forth in claim 1 wherein said measuring means includes a gauge member extending generally parallel to the shaft and having a first end located a known distance from the bearing assembly surface, and an opposite second end located adjacent the reference point to form a gap between said second end and the reference point.

4. An apparatus as set forth in claim 3 wherein said first end of said gauge member is aligned with the bearing assembly surface so that said known distance is equal to zero.

5. An apparatus as set forth in claim 4 wherein said frame includes a wall, and further including means on said frame for supporting the shaft with the bearing asembly surface against said wall, and wherein said gauge member extends from said wall toward the reference point.

6. An apparatus as set forth in claim 5 wherein said loading means includes said supporting means.

7. An apparatus as set forth in claim 3 wherein the bearing assembly is supported by a bearing housing including the wall surface and a housing surface spaced said known distance from the wall surface, and wherein said first end of said gauge member is aligned with the housing surface.

8. An apparatus as set forth in claim 1 wherein the loading means includes means for supporting the bearing assembly against movement in one direction axially of the shaft, and means for exerting on the bearing assembly in said one direction a force equal to the desired axial loading of the bearing assembly.

9. An apparatus as set forth in claim 8 wherein said means for supporting the bearing assembly includes means for supporting the shaft against axial movement in said one direction.

10. An apparatus as set forth in claim 8 wherein said means supporting the bearing assembly includes means engageable with the bearing assembly for preventing movement of the bearing assembly in said one direction, and wherein said means for exerting said force includes means for exerting said force on the shaft.

11. An apparatus as set forth in claim 8 and further comprising a frame including said supporting means, and wherein said means for exerting said force includes a loading screw extending axially of the shaft and threadedly engaging said frame.

12. An apparatus as set forth in claim 11 wherein said loading screw includes a screw portion threadedly engaging said frame and extending axially of the shaft, a loading portion adapted to engage the shaft or the bearing assembly to exert said force thereon, said loading portion being mounted on said screw portion for sliding movement relative thereto axially of the shaft, and a spring located between said screw portion and said loading portion for biasing said loading portion in said one direction relative to said screw portion.

13. An apparatus as set forth in claim 12 wherein said loading screw includes means for indicating when the force exerted by said spring on said loading portion is equal to the desired axial loading of the bearing assembly.

14. An apparatus as set forth in claim 13 wherein said indicating means includes means for indicating the deflection of said spring.

15. An apparatus as set forth in claim 1 wherein the device includes a second wall surface, wherein the shaft has thereon a second bearing assembly including a second surface supported by the second wall surface with a second shim between the second bearing assembly surface and the second wall surface, wherein the second bearing assembly surface is the reference point, and wherein said measuring means measures the distance between the first-mentioned bearing assembly surface and the second bearing assembly surface.

16. An apparatus for use with a device including a first wall surface, a second wall surface, and a removable, rotatable shaft having thereon a reference point, the shaft also having thereon a first bearing assembly including a first surface supported by the first wall surface with a first shim between the first bearing assembly surface and the first wall surface, and with a first fixed distance between the first wall surface and the reference point when the first bearing assembly is axially loaded in the device, and the shaft further having thereon a second bearing assembly including a second surface supported by the second wall surface with a second shim between the second bearing assembly surface and the second wall surface, and with a second fixed distance between the first wall surface and the second bearing assembly surface when the second bearing assembly is axially loaded in the device, said apparatus measuring the required thicknesses of the first and second shims without inserting the shaft into the device, and said apparatus comprising a frame, first means connectable to said frame for axially loading the first bearing asembly with the shaft out of the device, second means connectable to said frame for axially loading the second bearing assembly with the shaft out of the device, third means connectable to said frame for measuring the first existing distance between the first bearing assembly surface and the reference point, and fourth means connectable to said frame for measuring the second existing distance between the first bearing assembly surface and the second bearing assembly surface, whereby the thickness of the first shim is determined by comparing said first existing distance to the first fixed distance, and whereby the thickness of the second shim is determined by comparing said second existing distance to the second fixed distance, and, if the second wall surface faces in the same direction as the first wall surface, adding the thickness of the first shim, or, if the second wall surface faces in the opposite direction from the first wall surface, subtracting the thickness of the first shim.

17. An apparatus as set forth in claim 16 wherein said third means includes a first gauge member extending generally parallel to the shaft and having a first end located a known distance from the first bearing assembly surface, and an opposite second end located adjacent the reference point to form a gap between said second end and the reference point, and wherein said fourth means includes a second gauge member extending generally parallel to the shaft and having a first end located a known distance from the first bearing assembly surface, and an opposite second end located adjacent the second bearing assembly surface to form a second gap between said second end of said second gauge member and the second bearing assembly surface.

18. An apparatus as set forth in claim 16 wherein said first and second means include means for simultaneously and equally loading the first and second bearing assemblies with the shaft out of the device.

19. A method for use with a device including a wall surface, and a removable, rotatable shaft having thereon a reference point and a bearing assembly, the bearing assembly having a surface supported by the wall surface with a shim between the bearing assembly surface and the wall surface, and with a fixed distance between the wall surface and the reference point when the bearing assembly is axially loaded in the device, said method measuring the required thickness of the shim without inserting the shaft into the device, and said method comprising the steps of axially loading the bearing assembly with the shaft out of the device, and measuring the existing distance between the bearing assembly surface and the reference point, whereby the thickness of the shim is determined by comparing said existing distance to the fixed distance.

20. A method as set forth in claim 19 wherein the shaft has thereon a gear which is the reference point, and wherein said measuring step includes measuring the distance between the bearing assembly surface and the gear.

21. A method as set forth in claim 19 wherein said measuring step includes the steps of providing a member having opposite first and second ends, extending said member generally parallel to the shaft with said first end located a known distance from the bearing assembly surface and with said second end located adjacent the reference point to form a gap between said second end and the reference point, and measuring the width of said gap.

22. A method as set forth in claim 21 wherein said extending step includes extending said rod member with said first end aligned with the bearing assembly surface so that said known distance is equal to zero.

23. A method as set forth in claim 22 wherein said member has a length, and wherein said calculating step includes calculating the difference between the fixed distance and the sum of the width of said gap and the length of said member.

24. A method for use with a device including a first wall surface, a second wall surface, and a removable, rotatable shaft having thereon a reference point, the shaft also having thereon a first bearing assembly including a first surface supported by the first wall surface with a first shim between the first bearing assembly surface and the first wall surface, and with a first fixed distance between the first wall surface and the reference point when the first bearing assembly is axially loaded in the device, and the shaft further having thereon a second bearing assembly including a second surface supported by the second wall surface with a second shim between the second bearing assembly surface and the second wall surface, and with a second fixed distance between the first wall surface and the second bearing assembly surface when the second bearing assembly is axially loaded in the device, said method measuring the required thicknesses of the first and second shims without inserting the shaft into the device, and said method comprising the steps of axially loading the first bearing assembly with the shaft out of the device, axially loading the second bearing assembly with the shaft out of the device, measuring the first existing distance between the first bearing assembly surface and the reference point, and measuring the second existing distance between the first bearing assembly surface and the second bearing assembly surface, whereby the thickness of the first shim is determined by comparing said first existing distance to the first fixed distance, and whereby the thickness of the second shim is determined by comparing said second existing distance to the second fixed distance, and, if the second wall surface faces in the same direction as the first wall surface, adding the thickness of the first shim, or, if the second wall surface faces in the opposite direction from the first wall surface, subtracting the thickness of the first shim.

25. A method as set forth in claim 24 wherein said first measuring step includes the steps of providing a first member having opposite first and second ends, extending said first member generally parallel to the shaft with said first end located a known distance from the first bearing assembly surface and with said second end located adjacent the reference point to form a gap between said second end and the reference point, and measuring the width of said gap, and wherein said second measuring step includes the steps of providing a second member having opposite first and second ends, extending said second member generally parallel to the shaft with said first end of said second member spaced a known distance from the first bearing assembly surface and with said second end of said second member located adjacent the second bearing assembly surface to form a second gap between said second end of said second member and the second bearing assembly surface, and measuring the width of said second gap.

26. A method as set forth in claim 24 wherein said first and second loading steps include the step of simultaneously and equally loading the first and second bearing assemblies with the shaft out of the device.

* * * * *